United States Patent Office 3,431,278
Patented Mar. 4, 1969

3,431,278
PHENYL VINYLENE OXALATES
Peter Salvatore Forgione, Stamford, Conn., assignor to American Cyanamid Company, Stamford, Conn., a corporation of Maine
No Drawing. Filed June 7, 1963, Ser. No. 286,212
U.S. Cl. 260—340.2  2 Claims
Int. Cl. C07d 15/12; C08f 17/00, 19/10

This invention relates to a method for increasing the heat distortion temperature, glass transition temperature and hardness of vinyl polymers. More particularly, this invention relates to a method for increasing the heat distortion temperature, glass transition temperature and hardness of vinyl polymers which comprises copolymerizing the vinyl monomer with at least 1%, by weight, based on the weight of the vinyl monomer, of a compound having the formula (I) 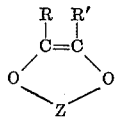

wherein R and R' are hydrogen or an aryl radical having from 6 to 10 carbon atoms, inclusive, at least one of said R and R' being an aryl radical and Z is either a

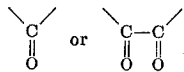

radical.

Still more particularly, this invention relates to compositions of matter characterized by their high glass transition temperature, heat distortion temperature and hardness comprising copolymers of a vinyl monomer and at least 1%, by weight, based on the weight of the vinyl monomer, of a copolymerizable monomer corresponding to Formula I.

Still further, this invention relates to a novel group of compounds comprising those wherein Z in the above formula is

and to a method for the production thereof.

The production of polymeric materials, both homopolymers and copolymers, from vinyl type monomers is well known in the art. These polymers have properties which render them useful for many applications for which other type polymers are unfit. There are, however, some properties of these vinyl type polymers which render them inapplicable for certain purposes. That is to say, such properties as the heat distortion temperature, glass transition temperature and hardness of many vinyl polymers are not sufficiently high to enable their use in applications where hard, thermally stable properties are needed, such as coatings, laminates, moldings, castings and the like, wherein the polymers in these forms, are utilized in areas of application wherein they are subjected to conditions of high temperature.

Normally, when vinyl monomers are copolymerized with various other copolymerizable monomers, the heat distortion temperature and glass transition temperature of the copolymers are lower than that of the homopolymers of the vinyl monomers themselves. For example, such a phenomena is discussed in articles by White, Trans. Farad. Soc., vol. 56, p. 1529, 1960 and Beevers, Trans. Farad. Soc., vol. 58, p. 1465, 1962. One method for increasing these properties of the vinyl homopolymers has been to cross-link the homopolymer via other reactionable groups present.

I have now found that vinyl type polymers may be produced, which polymers possess glass transition temperatures, heat distortion temperatures and hardness superior to those of the unmodified vinyl polymer. By modifying the vinyl polymer, I have found that these properties are greatly enhanced. The increase in glass transition temperature, heat distortion temperature and hardness results from my novel process of copolymerizing the vinyl monomer with a compound represented by Formula I, above.

It is therefore an object of the present invention to provide a method for increasing the glass transition temperature, the heat distortion temperature and hardness of vinyl polymers.

It is a further object of the present invention to provide a method for increasing the glass transition temperature, the heat distortion temperature and hardness of vinyl polymers which method comprises copolymerizing the vinyl monomer, or mixtures of vinyl monomers, with at least 1%, by weight, based on the weight of the vinyl monomers, of a copolymerizable monomeric compound represented by Formula I, above.

It is a further object of the present invention to provide vinyl polymers characterized by their high heat distortion temperatures, glass transition temperatures and hardness comprising copolymers of vinyl monomers, or mixtures of vinyl monomers, and at least 1%, by weight, based on the weight of the vinyl monomer, of a copolymerizable monomer represented by Formula I, above.

It is a further object of the present invention to provide a novel group of compounds comprising those wherein Z in Formula I represents the

radical and a method for the production thereof.

As mentioned above, I have discovered a method for increasing the glass transition temperature, the heat distortion temperature and hardness of vinyl polymers. This method comprises copolymerizing the vinyl monomer, or mixture of vinyl monomers, with an aryl vinylene carbonate or oxalate. My invention is further enhanced by the fact that the polymerization procedure employed is not critical and any known procedure for the polymerization of a vinyl monomer or mixtures of vinyl monomers may be employed.

A method which may be used for example, and which is perhaps preferred because of its efficacy of execution, comprises conducting the polymerization in the presence of a free-radical generating catalyst and a polymerization regulator, at temperatures of from about 10° C. to 90° C. Any known free-radical generating catalyst which initiates the polymerization of vinyl monomers, for example, methyl methacrylate, may be used. Suitable catalysts include the organic peroxides such as methyl ethyl ketone peroxide, benzoyl peroxide; the hydroperoxides such as cumene hydroperoxide; the persulfate type compounds such as potassium persulfate, or catalysts such as azobisisobutyronitrile and the like. Additionally, such catalysts as lauroyl peroxide, 2,5 - dimethyl - 2,5 - di(t - butylperoxy) hexane, the dialkyl peroxides, e.g., diethyl peroxide, t-butyl peroxypivalate, dipropyl peroxide, dilauryl peroxide, di-(tertiary-butyl)peroxide and di-(tertiary-amyl)peroxide, such peroxides often being designated as ethyl, propyl, lauryl, tertiary-butyl and tertiary-amyl peroxides; the alkyl hydrogen peroxides, e.g., tertiary-butyl hydrogen peroxide (tertiary-butyl hydroperoxide), tertiary-amyl hydrogen peroxide (tertiary-amyl hydroperoxide), etc.; symmetrical diacyl peroxides, for instance, peroxides which commonly are known under such names as acetyl peroxide, propionyl peroxide, phthaloyl peroxide, benzoyl peroxide, etc.; unsymmetrical or mixed diacyl peroxides, e.g., acetyl benzoyl peroxide, propionyl benzoyl peroxide, etc.; and salts of inorganic per-acids, e.g., ammonium persulfate, sodium persulfate, sodium percarbonate, potassium percarbonate, sodium perborate, potassium perborate, sodium perphosphate, potassium perphosphate, etc. Other examples of organic peroxide catalysts which may be employed are the following: tertiary-butyl diperphthalate, tertiary-butyl perbenzoate, 2,4-dichlorobenzyl peroxide, p-chlorobenzoyl peroxide, 2,2-bis(tertiary-butylperoxy)butane, hydroxyheptyl peroxide, the diperoxide of benzaldehyde, azobisisobutyronitrile and the like. Generally the water-soluble, as well as the monomer-soluble, types of catalyst may be employed in amounts ranging from about 0.05 to 5.0 percent, by weight, of the monomer employed.

Emulsion polymerization procedures may also be employed, with any available emulsifier being used, with compounds such as fatty acid soaps, rosin soaps, sodium lauryl sulfate, non-ionic emulsifiers such as polyethoxy alkylated phenols, compounds such as dioctyl sodium sulfosuccinate, dihexyl sodium sulfosuccinate and the like being exemplary, in amounts ranging from about 1% to 8%, by weight, preferably 4% to 5%, by weight, based on the amount of vinyl monomer or monomers employed.

Various other polymerization procedures, such as solution polymerization, may also be employed, the choice being governed by the monomer, etc. and by the discretion of the skilled artisian conducting the invention.

Polymerization regulators may be used in any of these processes, with compounds such as the organic sulfur compounds, i.e., the thio acids, mercaptans such as benzyl mercaptan, aliphatic mercaptans possessing at least 6 carbon atoms such as octyl, dodecyl and tertiary dodecyl mercaptan, mixtures of mercaptans such as are obtained from lauryl alcohol, nitrohydroazine, amino compounds, carbon tetrachloride, and any other well known polymerization modifier or regulator, being exemplary. It is preferred, however, to use the alkyl mercaptans of low water solubility, such as dodecyl mercaptan in amounts ranging from about 0.01% to 5.0%, by weight, of the monomers employed.

The invention is further enhanced by the fact that substantially all of the known vinyl polymers are materially improved by my novel process. That is to say, such monomers as methyl methacrylate, styrene, acrylonitrile, and the like may be used and when copolymerized with the aryl vinylene carbonate or oxalate, result in polymers having higher heat distortion and glass transition temperatures and greater hardness than a homo or copolymer produced from the vinyl monomer or monomers alone. The preferred monomers which may be used to produce the vinyl polymers which are enhanced in properties by my novel process are the methacrylic acid esters of the formula (II)

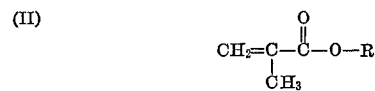

wherein R represents an alkyl radical containing from 1 to 6 carbon atoms, inclusive. Compounds which are represented by the above formula and consequently may be used in the present invention include methyl methacrylate, ethyl methacrylate, propyl methacrylate, isopropyl methacrylate, n-butyl methacrylate, isobutyl methacrylate, amyl methacrylate, hexyl methacrylate, and the like. These monomers may be used singly or in combination with one another when being reacted with the carbonate or oxalate. The molecular weights of any of the vinyl polymers employed are not critical, however, we have found that the higher molecular weight polymers tend to produce the more thermally stable compositions.

Other examples of monomers which can be utilized alone, with the monomers represented by Formula I or with one another, when being reacted with the oxalate or carbonate to produce my novel polymers, are such monomers as the unsaturated alcohol esters, more particularly the allyl, methallyl, crotyl, vinyl, methvinyl, etc., esters of saturated and unsaturated aliphatic and aromatic monobasic and polybasic acids such, for instance, as acetic, propionic, butyric, valeric, caproic, crotonic, oxalic, benzoic, phenylacetic, phthalic, terephthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic and polybasic acids, illustrative examples of which appear above; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl naphthalene, vinylcyclohexane, vinyl pyridine, divinyl benzene, trivinyl benzene, allyl benzene, diallyl benzene, the various alpha-substituted styrenes and alpha-substituted ring-substituted styrenes, e.g., alpha-methylstyrene, alpha-methyl-para-methyl styrene, etc.; unsaturated amides, for instance, acrylamide, and N-substituted acrylamides, e.g., N-methylol acrylamide, N-allyl acrylamide, N-methyl acrylamide, N-phenyl acrylamide, and the like.

Among the monomers which are preferred for use in carrying my invention into effect are methyl methacrylate, styrene, and acrylonitrile, either alone or in combination. Other monomers which may be used are given, for instance, in U.S. Patent No. 2,601,572, dated June 24, 1952, where examples are given both by class and species.

The improvement in the properties of glass transition temperature, heat distortion temperature and hardness resulting from my novel process acrues from the incorporation of at least 1%, by weight, based on the weight of the vinyl monomer, of an aryl vinylene carbonate or oxalate represented by Formula I, above. Examples of carbonates and oxalates which may be used in the process of the present invention and are therefore represented by Formula I include phenyl vinylene carbonate, tolyl vinylene carbonate, phenyl vinylene oxalate, tolyl vinylene oxalate, xylyl vinyl carbonate, naphthyl vinylene carbonate, xylyl vinylene oxalate, naphthyl vinylene oxalate, diphenyl vinylene carbonate, ditolyl vinylene carbonate, diphenyl vinylene oxalate, ditolyl vinylene oxalate, dixylyl vinylene carbonate, dinaphthyl vinylene carbonate, dixylyl vinylene oxalate, dinaphthyl vinylene oxalate, phenyltolyl vinylene carbonate, phenylxylyl vinylene carbonate, phenyltolyl vinylene oxalate, phenylxylyl vinylene oxalate, xylylnaphthyl vinylene carbonate, xylylnaphthyl vinylene oxalate and the like.

The aryl vinylene carbonates may be produced by any known procedure or synthesis including that set forth in German Patent 1,044,104 or via the procedure for the production of vinylene carbonates set forth in U.S. Patent No. 2,918,478, said patents hereby being incorporated herein by reference. A preferred procedure for the production of the aryl vinylene carbonates comprises bubbling phosgene into a dry dioxane solution of an appropriately aryl substituted keto-carbinol. The reaction is conducted at temperatures of around 0° C. and the reaction is generally allowed to proceed for several hours. The resultant product can then be recovered by merely removing the solvent utilizing any technique, e.g. distillation.

The novel vinylene oxalates of the instant invention are produced by reacting oxalyl chloride with an appropriately aryl substituted keto-carbinol in solution. The reaction occurs in two steps, the first of which results in the formation of a keto-half acid chloride ester and the second of which produces the desired oxalate.

The reaction, both steps included, proceeds as follows:

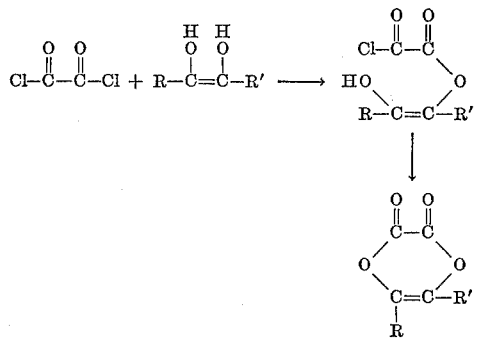

Both steps are conducted in the presence of an inert gas such as nitrogen, argon, neon, carbon dioxide and the like and both are conducted at atmospheric pressure, although higher or lower pressures may be used if desired or necessary. The temperature of the first step as maintained within the range of from about −30° C. to about 50° C. and is conducted for from about 1 to 5 hours. The reaction is carried out in the presence of a solvent such as, for example, the aromatic hydrocarbons, i.e. benzene, toluene, xylene, etc., the aliphatic hydrocarbons i.e. hexane, heptane and the like, dioxane, petroleum ether, tetrahydrofuran, etc. An excess of the oxalyl chloride is generally preferred since it enables substantially complete reaction of the active ingredients and assures the production of the half ester rather than other undesired side reactions. The second step is conducted at temperatures ranging from about 180° C. to about 250° C. for from about 2 to 24 hours.

The resultant oxalates are crystalline solids, yellowish in co'or and useful for the applications more fully set forth hereinabove.

These new oxalates are then useful as the glass transition temperature, heat distortion temperature and hardness modifiers as set forth hereinabove, i.e. they are copolymerizable with the vinyl monomers.

The polymeric products produced by the process of the present invention are useful as such for any application in which the usual vinyl polymer is used. However, in view of the fact that the thermal stability and hardness of the polymers are increased they are also useful for applications, i.e. coatings, molded articles and the like wherein they must withstand higher temperatures and be of a more durable nature than their unmodified counterparts, i.e. homo- or copolymers.

There may be added to the novel products of the present invention during or after the polymerization, such ingredients as light stabilizers, heat stabilizers, anti-oxidants, lubricants, plasticizers, pigments, fillers, dyes and the like, without detracting from the unique properties of our novel molding compositions.

The following examples are set forth for purposes of illustration only and are not to be construed as limitations on the present invention except as set forth in the appended claims. All parts and percentages are by weight unless otherwise specified.

EXAMPLE 1

Preparation of phenyl vinylene oxalate

To a suitable reaction vessel equipped with a stirrer, reflux condenser and a nitrogen inlet tube and containing dry heptane and 20 parts of oxalyl chloride are slowly added, at −15° C., 10 parts of benzoyl carbinol. The mixture is allowed to stir at room temperature for three hours and then at reflux for four hours, while flushed with nitrogen. The heptane solvent is then evaporated under vacuum and diphenyl ether is added. This mixture is then heated at 220° C. for three hours and then at 160° C. for 15 hours; again in a nitrogen atmosphere. Upon cooling, crystals deposit, which on recrystallization from hot toluene afford 6.8 parts of yellow phenyl vinylene oxalate, M.P. 174–175° C.

*Analysis.*—Calcd. for $C_{10}H_6O_4$: C, 63.15; H, 3.15; molecular weight 190. Found: C, 63.00; H, 3.23; molecular weight in $CH_3CN$ 187.1.

EXAMPLE 2

Following the procedure of Example 1, oxalyl chloride is reacted with benzoin to produce 6.0 parts of diphenyl vinylene oxalate, a yellowish crystalline solid.

EXAMPLE 3

Methyl methacrylate-phenyl vinylene carbonate copolymer

A degassed mixture of 45 parts of methyl methacrylate, 5 parts of phenyl vinylene carbonate and .05 part of azobisisobutyronitrile is heated at 60° C. for 3 hours in a suitable reaction vessel. After reaction, the polymeric plug is dissolved in chloroform and precipitated in a large volume of methanol. Filtration, followed by drying at 50° C. for 24 hours at 1 mm. Hg, affords 46.2 parts (92.6% yield) of polymer analyzing for 5.0 weight percent phenyl vinylene carbonate (3.1 mole percent) as determined by nuclear magnetic resonance. The intrinsic viscosity (dl./g.) of the copolymer in benzene at 30° C. was found to be 0.37, with a second order glass transition temperature of 124° C. as determined by differential thermal analysis (DTA). A Vicat softening temperature of 141° C. was obtained on a molded bar (ASTM).

EXAMPLE 4

Styrene-phenyl vinylene carbonate copolymer

A degassed mixture of 40 parts of distilled styrene, 10 parts of phenyl vinylene carbonate and .018 part of azobisisobutyronitrile is heated at 60° C. to low conversion, i.e. to the viscous flow stage in a suitable reaction vessel. The polymeric mixture is dissolved in benzene and precipitated in methanol with stirring. Filtration affords a 18.4% yield of dried copolymer composed of 20.3 weight percent of phenyl vinylene carbonate based on elemental analysis and an intrinsic viscosity (dl./g.) of 2.05 at 30° C. in benzene. The polymer flows at about 205° C. with a second order glass transition temperature of 129° C. (DTA). Its Vicat softening point is 154° C.

Elemental analysis of the coplymer shows the following composition: C, 87.49; H, 6.49; O, 6.00.

EXAMPLE 5

Acrylonitrile-phenyl vinylene carbonate copolymer

A solution made from 30 parts of acrylonitrile, 1 part of phenyl vinylene carbonate, .04 part of tertiary butyl perpivalate as catalyst and 100 parts of ethylene carbonate is degassed and polymerized at room temperature (21°C.) for two days. The resultant solid rubbery polymeric plug is dissolved in dimethylformamide and precipitated by the dropwise addition of this solution into a large excess of methanol with stirring. Drying of the polymer at 60° C., 1 mm. Hg, affords 20 parts of material, containing 11.6 weight percent of phenyl vinylene carbonate based on nitrogen analysis. Nitrogen analysis: N=23.34%.

This copolymer shows a glass transition temperature higher than 150° C. (DTA).

EXAMPLE 6

Methyl methacrylate-acrylonitrile-styrene-phenyl vinylene carbonate (A) A control terpolymer system comprising 35.5 parts of methyl methacrylate, 9.5 parts of styrene and 5 parts of acrylonitrile with .02 part of t-butyl perpivalate as catalyst is prepared as indicated in Example 3 except that the mixture is heated at 40° C. for 20 hours and no carbonate is present. The polymer is dissolved in chloroform and precipitated in a large excess of methanol, affording 48 parts of terpolymer. The glass transition temperature of this polymer is 88° C. (DTA method).

(B) The same weights of monomer and catalyst as in Example 6(A) are used, except that 0.5 part of phenyl vinylene carbonate is added. Conditions and polymerization time are the same. The yield of tetrapolymer is 47 parts and it has a glass transition temperature of 93° C.

EXAMPLE 7

Methyl methacrylate-phenyl vinylene oxalate copolymer

A degassed mixture of 6.1 parts of methyl methacrylate, 4.4 parts of phenyl vinylene oxalate and .02 part of azobisisobutyronitrile as catalyst is heated to 60° C. for 7 hours. The polymer is dissolved in chloroform and precipitated in methanol affording 5.5 parts of polymer. This copolymer has an intrinsic viscosity (dl./g.) in chloroform at 30° of 1.5 and analyzed (quantitative infrared) for 0.4 weight percent vinylene oxalate. The glass transition temperature (DTA method) for this copolymer is 124° C.

EXAMPLE 8

Methyl methacrylate-diphenyl vinylene carbonate copolymer

A degassed mixture of 8.0 parts of methyl methacrylate, 2.0 parts of diphenyl vinylene carbonate and 0.10 part of azobisisobutyronitrile catalyst is heated at 60° for half an hour. Work-up of the polymer reaction product, as above, affords 2.28 parts of copolymer having an intrinsic viscosity (dl./g.) at 30° C. in chloroform of 1.1 and analyzing 0.4 weight precent diphenyl vinylene carbonate (NMR). The glass temperature (DTA) of the polymer is 124° C.

TABLE I

| Polymer of Example | Glass Transition Temp., ° C. | Vicat Softening Temp., ° C. | Hardness | | |
|---|---|---|---|---|---|
| | | | Knoop KHN 100 | Barcol | Bierbaum, 3 g. Load |
| 3 | 124 | 141 | 27.6 | 47.0 | 53.0 |
| PMMA [1] | 100-110 | 116 | 25.5 | 38.7 | 52.7 |
| 4 | 129 | 154 | 22.4 | 27.5 | 28.8 |
| Polystyrene | 90-106 | 118 | 18.4 | 12-15 | 18.4 |

[1] Poly(methyl methacrylate).

Following the procedure of Example 3, copolymers were produced with methyl methacrylate and phenyl vinylene carbonate varying the weights of the carbonate from 1% to 54%. The results of these variations are set forth in Table II below.

TABLE II.—COPOLYMERS OF PHENYL VINYLENE CARBONATE-METHYL METHACRYLATE

| Example | Weight Percent φVC | Weight Percent Methyl Methacrylate | GTT, ° C. | VST, ° C. |
|---|---|---|---|---|
| 8a | 75 | 25 | 270 | 298 |
| 9 | 54 | 46 | 242 | 261 |
| 10 | 36 | 64 | 167 | 189 |
| 11 | 31 | 69 | 165 | 183 |
| 12 | 6 | 94 | 134 | 164 |
| 13 | 5 | 95 | 130 | 151 |
| 14 | 2 | 98 | 124 | 141 |
| 15 | 1 | 99 | 124 | 141 |

φVC = Phenyl vinylene carbonate.
GTT = Glass transition temperature (DTA method).
VST = Vicat softening temperature.

Again following the procedure of Example 3, the following examples were run varying the modifier oxalate or carbonate and the monomer copolymerized therewith. The results are given below in Table III.

TABLE III

| Example | Vinyl Monomer(s) | Carbonate or Oxalate |
|---|---|---|
| 16 | Methyl methacrylate/acrylonitrile (50/50). | Phenyl vinylene oxalate. |
| 17 | Methyl styrene | Xylyl vinylene carbonate. |
| 18 | Acrylonitrile | Tolyl vinylene oxalate. |
| 19 | Methyl methacrylate | Phenyltolyl vinylene oxalate. |
| 20 | Methyl methacrylate/styrene (50/50). | Diphenyl vinylene oxalate. |
| 21 | Acrylonitrile/styrene (75/25) | Naphthyl vinylene oxalate. |

In each instance, Examples 16–21, the GTT and VST were materially increased over that of the homo or copolymer produced with the monomers alone.

I claim:
1. A compound having the formula

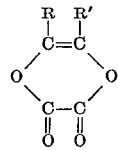

wherein R and R' are selected from the group consisting of hydrogen and an aryl radical having from 6 to 10 carbon atoms, inclusive, at least one of said R and R' being an aryl radical selected from the group consisting of phenyl, tolyl, xylyl and naphthyl radicals.

2. Phenyl vinylene oxalate.

References Cited

UNITED STATES PATENTS 3,359,240  1/1963  Hubbard et al.  260—340.2

NORMA S. MILESTONE, Primary Examiner.

U.S. Cl. X.R.

260—77.5, 78.5, 543